(12) United States Patent
Leterrier et al.

(10) Patent No.: US 10,399,415 B2
(45) Date of Patent: Sep. 3, 2019

(54) MOTOR VEHICLE TAILGATE COMPRISING A PLASTIC BOX STRUCTURE

(71) Applicants: Franck Leterrier, Saint Priest (FR); Issam Khayat, Lyons (FR); Martin Struss, Bratislava (SK)

(72) Inventors: Franck Leterrier, Saint Priest (FR); Issam Khayat, Lyons (FR); Martin Struss, Bratislava (SK)

(73) Assignee: Compagnie Plastic Omnium (FR)

( * ) Notice: Subject to any disclaimer, the term of this patent is extended or adjusted under 35 U.S.C. 154(b) by 0 days.

(21) Appl. No.: 15/740,695

(22) PCT Filed: Jun. 28, 2016

(86) PCT No.: PCT/FR2016/051607
§ 371 (c)(1),
(2) Date: Dec. 28, 2017

(87) PCT Pub. No.: WO2017/001772
PCT Pub. Date: Jan. 5, 2017

(65) Prior Publication Data
US 2018/0186220 A1    Jul. 5, 2018

(30) Foreign Application Priority Data

Jun. 29, 2015    (FR) ...................... 15 56021

(51) Int. Cl.
*B60J 5/10*    (2006.01)
*B60Q 1/30*    (2006.01)
*B60R 13/02*    (2006.01)

(52) U.S. Cl.
CPC .............. *B60J 5/107* (2013.01); *B60Q 1/302* (2013.01); *B60R 13/0243* (2013.01); *B60R 2013/0287* (2013.01)

(58) Field of Classification Search
CPC ....... B60J 5/107; B60Q 1/302; B60R 13/0243
USPC .................................................. 296/146.8, 56
See application file for complete search history.

(56) References Cited

U.S. PATENT DOCUMENTS

2017/0174056 A1* 6/2017 Kuntze .................... B60J 5/107
2018/0265141 A1* 9/2018 Depardon ............. B62D 35/007
2018/0272846 A1* 9/2018 Coudron .................. B60J 10/84
2018/0312204 A1* 11/2018 Schellekens ............ B29C 45/16

FOREIGN PATENT DOCUMENTS

| DE | 29924008 U1 | 9/2001 |
| EP | 1234752 A1 | 8/2002 |
| FR | 2672017 A1 | 7/1992 |
| WO | 02057102 A1 | 7/2002 |

* cited by examiner

*Primary Examiner* — Jason S Morrow
(74) *Attorney, Agent, or Firm* — St. Onge Steward Johnston & Reens, LLC

(57) ABSTRACT

The motor vehicle tailgate has a plastic box structure including at least one structural element supporting a rear screen. The structural element delimits, with the rear screen, a housing including an interior opening, the interior opening being closed by way of a lining which is attached in such a way that the housing houses an electrical element of the vehicle.

10 Claims, 4 Drawing Sheets

MOTOR VEHICLE TAILGATE COMPRISING A PLASTIC BOX STRUCTURE

FIELD OF INVENTION

This invention relates to a motor vehicle tailgate comprising a plastic box structure comprising at least one structural element supporting a rear screen.

BACKGROUND OF THE INVENTION

It is known to manufacture tailgate structural elements from steel, for example lateral uprights surrounding the rear screen, or a lower horizontal cross member arranged in the lower part of the rear screen. This type of steel structural element generally consists of an elongated hollow body with a closed cross-section to stiffen the tailgate and arrange a rear screen bonding track which is attached to the structural element. It is also possible to manufacture plastic structural elements, not requiring a closed cross-section and having for example a greater depth and equivalent stiffness. In this case, the cross-section of the structural element can be U-shaped with an opening facing the outside of the vehicle and subsequently closed by the tailgate screen. In these two types of structural element, the space delimited by the structural element and optionally the screen is a closed inaccessible space.

SUMMARY OF THE INVENTION

This invention aims to propose a tailgate arranged more optimally and thus limit the costs of manufacturing the back of the vehicle.

To this end, the invention relates to a motor vehicle tailgate comprising a plastic box structure comprising at least one structural element supporting a rear screen, the structural element being elongated in a "longitudinal" direction, in which the structural element delimits, with the rear screen, a housing comprising an interior opening, the interior opening being closed by means of a lining which is attached so as to form at least partially a longitudinal wall of the housing adjacent to the rear screen and arranged towards the inside of the rear screen, in such a way that the housing houses an electrical element of the vehicle.

Thus, it is proposed to use a part of the vehicle which is traditionally not accessible after assembly, and therefore not used, to provide new vehicle functions, i.e. the housing of electrical functions. The inventors have in fact discovered that when using plastic structural elements, the longitudinal inner wall of the structural element arranged towards the inside of the rear screen, or second leg of the ∪, is not totally essential to provide the rigidity function of the upright and can be replaced by a lining. This type of lining no longer needs to provide a rigidity function and can advantageously provide a function of closing a dry area, in order to house an electrical element. We therefore obtain an easy solution for integrating electrical elements in the hollow shape of the tailgate structural element, in addition to a decoration function provided by the lining, in particular to hide the inside of the structural element. It is understood that the interior opening is preferably sealed by the lining.

Furthermore, and particularly advantageously, a tailgate is therefore provided that can easily integrate rear optical elements, in particular brake lights, reversing lights, indicator lights, while the rear light units are traditionally arranged directly on the vehicle, for example in the lower part, on the body in the side areas or in air deflectors, also called spoilers, placed in the extension of the roof or of side parts of the rear. Thus, by providing the rear lights on the tailgate rather than on the rest of the vehicle, firstly new aesthetic configurations can be proposed for the tailgate and the rest of the vehicle, and secondly the rear of the vehicle is less constrained by the presence of optical elements, for example there is no need to provide sealed deflectors.

The term "plastic box structure" means a box structure composed, not exclusively, of plastic. It is understood that this expression includes in particular a box structure comprising a composite material. The term "vehicle electrical element" means any member delivering, receiving or passing electrical energy, for example and not exclusively an optical element, a camera, a sensor, a receiver, a transmitter, an antenna or an electric wire. Thus, the electrical element may perform a wide variety of functions, such as the temperature function, the rain function, the anti-pinch function, the radar function, the indicator light function, or the style lighting function, and also use a wide variety of technologies such as infrared, radio waves, capacitive sensor, etc. It is understood that the "interior opening" is an opening made in a longitudinal wall of the housing adjacent to the rear screen and arranged towards the inside of the rear screen, i.e. which is closer to the centre of the rear screen than an opposite longitudinal wall, which is considered as an exterior longitudinal wall of the housing. In other words, the inside is directed towards the centre of the rear screen and the outside is directed in the opposite direction. A longitudinal wall is understood to be, in reference to the elongated shape of the structural element, the direction of elongation defining the longitudinal direction. It is understood that the interior longitudinal wall is a wall which is adjacent to the rear screen, often substantially perpendicular to the rear screen, and which is therefore different from a bottom longitudinal wall which is substantially parallel to the rear screen. It is also understood that a tailgate "rear screen" is a vehicle rear window, made for example of glass. It is generally transparent and may locally include opaque parts, produced for example by screen printed areas.

According to advantageous but non-mandatory aspects of the invention, the tailgate may include one or more of the following characteristics, taken alone or in combination.

The structural element belongs to the group comprising a lateral upright and a horizontal cross member. In particular, the plastic box structure may comprise three structural elements, i.e. two lateral uprights connected by a lower horizontal cross member.

The lining forms a support for the electrical element. Thus, the electrical element can be preassembled to the lining before this subassembly is attached to the structural element. The fact that it is the lining, and not the structural element, which carries the electrical element also simplifies maintenance and replacement of the electrical element. In addition, integrating the electrical element in the lining makes it easier to manage the optional functions of a vehicle series given on the basis of a single tailgate. In fact, since the lining is an attached part, different linings can be attached depending on the electrical options to be integrated. However, it is easier to manage the complexity by making different shapes on the linings, generally of smaller dimensions, than on larger linings.

The electrical element is an optical element, for example a light source.

The lining comprises an attachment part for a light source and an attachment part for a reflector, these attachment parts being for example holes made in offset support surfaces, i.e. at different distances from the rear screen. The light source consists for example of a printed circuit board (PCB) and light emitting diodes (LEDs). The reflector may comprise one or more clips to cooperate with the hole(s) so as to be attached to the lining. Moreover, it is further possible to provide an attachment part for an electrical cable in the lining. Thus, the lining may carry several optical elements.

The electrical element comprises an element from the group consisting of a camera, a sensor, a receiver, an antenna. These elements are often used for optional functions in a vehicle series. It is therefore interesting to integrate them in the attached lining.

The electrical element is a current receiver or transmitter, which is different from a wire or electrical cable which simply passes current. Thus, while an electric wire could be housed relatively easily in a non-dry area, ensuring that the wire is watertight, a current receiver or transmitter, such as an optical element, a camera, a sensor, a receiver or an antenna, must be housed in a dry area and the solution proposed here provides a particularly interesting advantage.

The structural element assembled with the screen and the lining has a cross-section whose outer contour has a substantially quadrilateral shape, for example a trapezoidal shape, one side of the quadrilateral being formed by the rear screen, two other consecutive sides being formed by the structural upright and the last side, connecting the rear screen and the structural element, being formed at least partially by the lining. Alternatively, one side of the quadrilateral is formed by the rear screen, an adjacent side is formed by the structural upright, an opposite side, adjacent to the rear screen, is formed by the lining, and the last side is formed partly by the lining and partly by the structural upright.

The lining is removably mounted on the structural upright, for example by means of a rivet, screw, clip or any other technical solutions allowing the lining part to be easily removed. Thus the lining can be easily removed from the structural element to simplify maintenance and replacement of the electrical element.

The lining comprises a longitudinal edge connecting with the rear screen, provided with a flexible seal, for example a leaf type seal or any other solution to achieve closure or light-tightness if the electrical element has a lighting function. Preferably, the rear screen comprises a screen printed area at the position of this seal to conceal the connection with the lining.

The lining is made of thermoplastic material. The structural upright is made of thermoplastic material, thermosetting material or composite material.

BRIEF DESCRIPTION OF THE DRAWINGS

The invention will be better understood on reading the accompanying figures, which are given solely by way of example and not limiting in any way, in which.

DETAILED DESCRIPTION OF THE INVENTION

Figure 1:
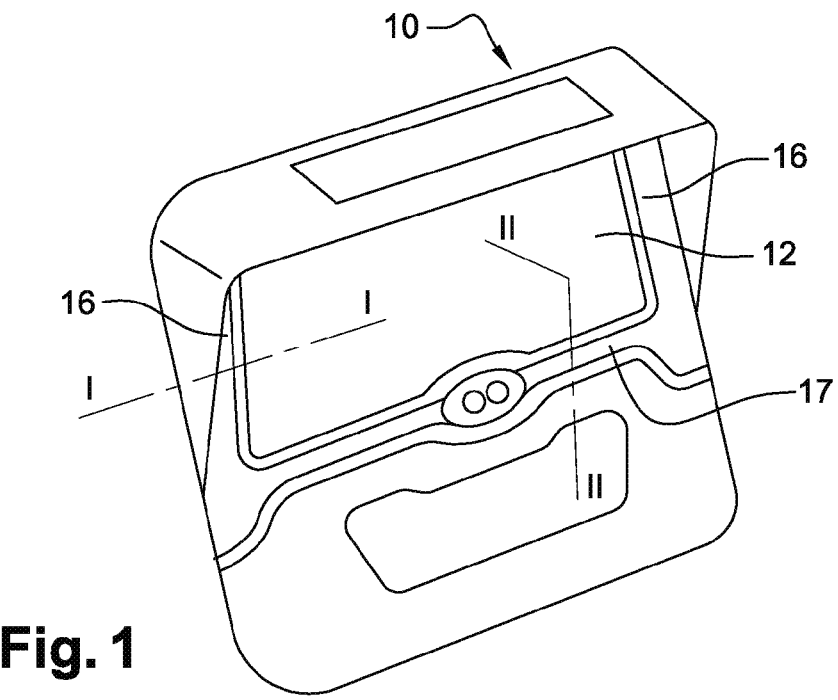
FIG. 1 is a diagrammatic perspective view of the outside of a motor vehicle tailgate according to one embodiment.

We now refer to FIG. 1. A motor vehicle tailgate 10 comprises a plastic box structure comprising, in this example, two side uprights 16 and a lower horizontal cross member 17 connecting the side uprights 16. The uprights 16 and the cross member 17 surround and support a glass rear screen 12. Each upright 16 and the cross member 17 each form an elongated structural element, each extending in a longitudinal direction corresponding to the axis of elongation of the structural element. More precisely, the cross member 17 is elongated in a substantially horizontal direction considering the tailgate when mounted on the vehicle so that the longitudinal direction of the cross member 17 corresponds to this substantially horizontal direction. The side uprights 16 are elongated in a substantially vertical direction when the tailgate is mounted on the vehicle, so that the longitudinal direction of the side uprights 16 is the substantially vertical direction.

Figure 2:
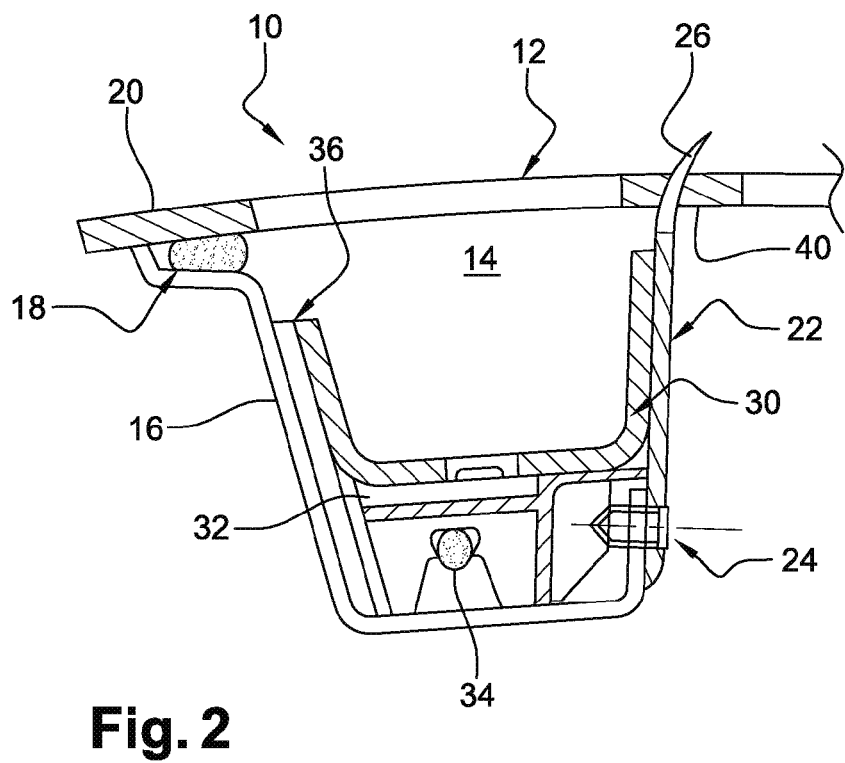
FIG. 2 is a diagrammatic cross-sectional view through the plane I-I of an upright of the tailgate of FIG. 1.

As can be seen on FIG. 2, the upright 16 has a "semi-U-shaped" cross-section, i.e. one side inner leg of the ∪ is not complete. The outer wall of the upright 16 is bonded to the screen 12 by a glue bead 18, which both maintains the screen 12 and seals the box structure with respect to the outside of the vehicle. The screen 12 has a screen printed area 20 at the bonding tape 18. ??// It is understood in this case that the outside of the vehicle corresponds to the part that is farthest from the centre of the rear screen 12, i.e. the left part of FIG. 2, and that the inside of the vehicle corresponds to the part that is closest to the centre of the rear screen 12, i.e. the right side of FIG. 2.

The upright 16 delimits, with the rear screen 12, a housing 14 comprising an interior opening which is closed by means of a lining 22 which is attached so as to form at least partially a longitudinal wall of the housing, adjacent and arranged towards the inside of the rear screen 12. The lining 22 is removably mounted to the upright 16, for example by means of a rivet 24. Furthermore, the lining 22 comprises a longitudinal edge connecting with the screen 12, provided with a leaf type flexible seal 26. The screen 12 comprises a second screen printed area 40 at the seal 26.

Thus, the upright 16, assembled with the screen 12 and the lining 22, has a cross-section whose outer contour has a substantially quadrilateral shape, in this case a trapezoidal shape. A first side of the quadrilateral is formed by the rear screen 12 and two other consecutive sides, the two left and lower sides, are formed by the upright 16. The last side, the right side connecting the rear screen 12 and the upright 16, is formed at least partially by the lining 22. In this example, substantially all the last side, except the part forming the corner, is formed by the lining. The upright 16 further comprises a blocking rib 36 to position the elements described below.

In this example, the lining 22 forms a support for several electrical elements housed in the housing 14. In particular, it carries a printed circuit board PCB 32 provided with LEDs 33 and a connection cable 34. The lining 22 also forms a support for a reflector 30.

Figure 3:
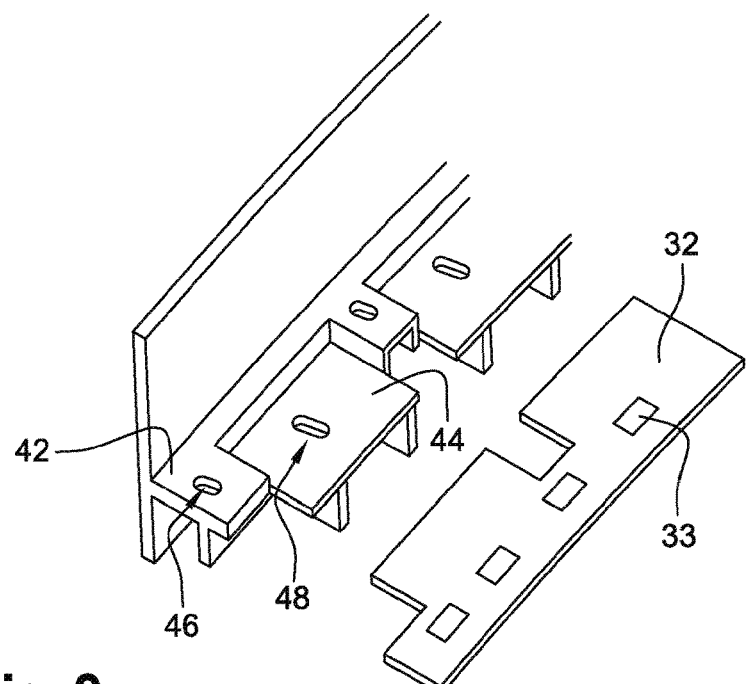
FIG. 3 is a detached and diagrammatic perspective partial view of the lining of the upright of FIG. 2.

As can be seen on FIG. 3, the lining 22 has a first group of support surfaces 42 and a second group of support surfaces 44 which are offset relative to each other, in other words the support surfaces 42 and the support surfaces 44 are at different distances from the rear screen 12. Attachment means 46, 48 are made respectively in these support surfaces 42, 44 to attach the reflector 30 and the PCB 32.

Figure 5:
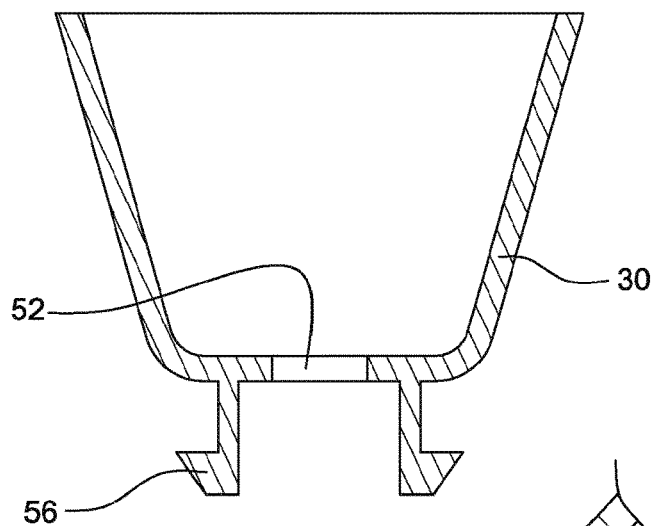
FIG. 5 is a diagrammatic cross-sectional view of the reflector of the upright of FIG. 2.

As illustrated on FIG. 5, the reflector 30 has at least one clip 56 to be inserted into the hole 46 to attach the reflector 30 to the lining 22. Similarly, clips 48 made on the support surfaces 44 are adapted to attach the PCB 32 by clipping.

Figure 4:
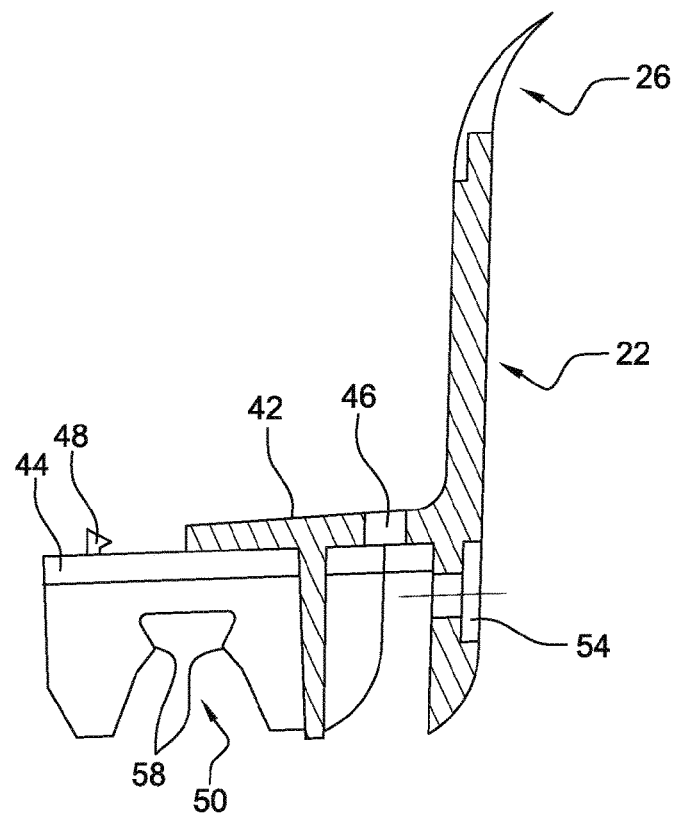
FIG. 4 is a diagrammatic cross-sectional view of the lining of the upright of FIG. 2.

The lining 22 is also shown on FIG. 4. In addition to the means for attaching the optical elements, the lining comprises means 50 for attaching the connection cable 34 consisting of a hollow with resilient tabs 58 to grip the cable 34. Moreover, the lining 22 comprises in its wall covering the side opening a hole 54 which allows it to be attached by the rivet 24 to the upright 16.

Figure 6:
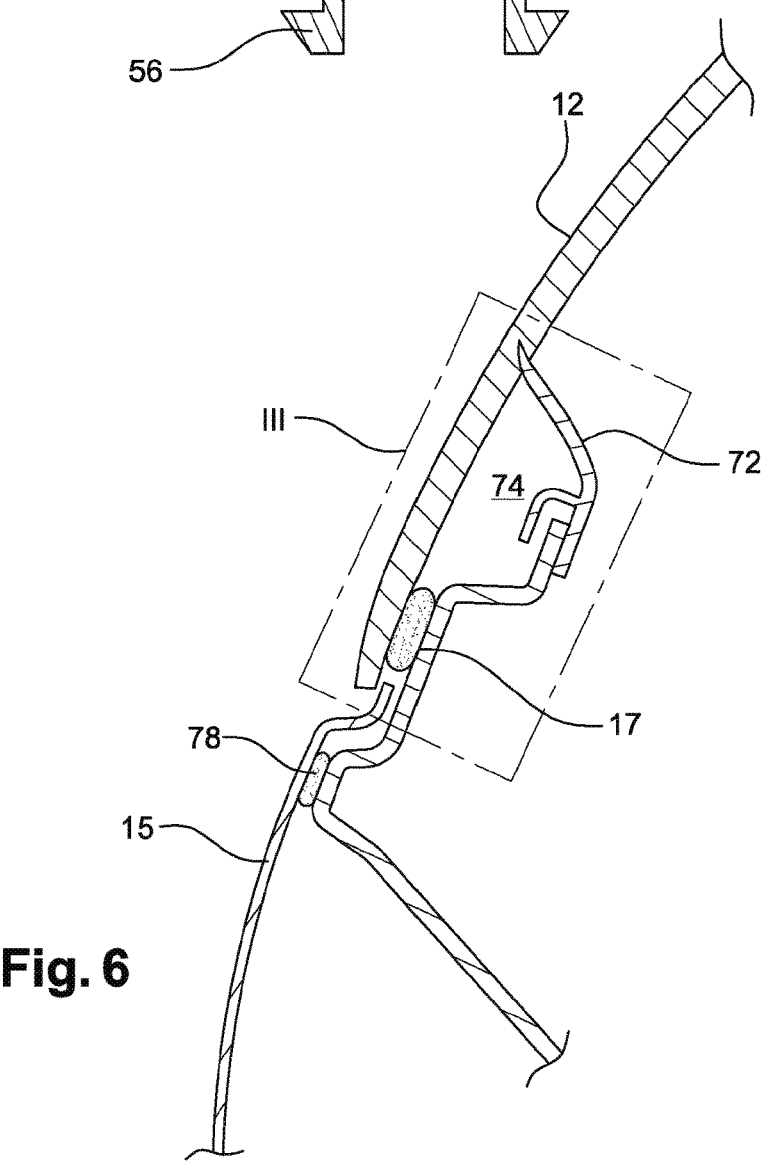
FIG. 6 is a diagrammatic cross-sectional view through the plane II-II of a cross member of the tailgate of FIG. 1.
Figure 7:
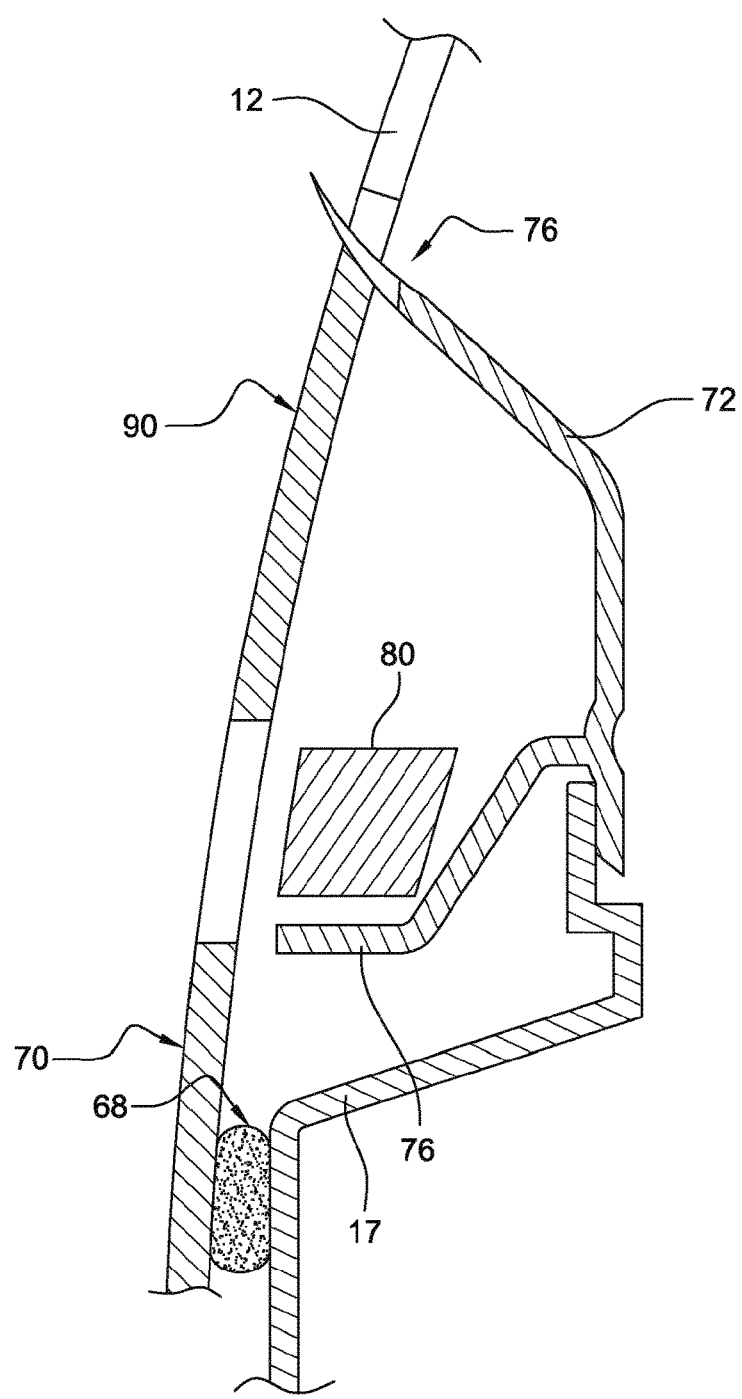
FIG. 7 is a detail view of part III of FIG. 6.

We now refer to FIGS. 6 and 7 illustrating a second example of a structural element.

In this case, the screen 12 extends vertically and covers in its lower part the junction of an outer skin 15 of the tailgate 10 with an inner lining of the tailgate, composed by the box structure. It is therefore understood that in this case, the outer part of the screen 12 is in the lower part and that the inner part of the screen, being closer to the centre of the screen, is in the upper part of the figure. The outer skin 15 is attached to the box structure of the tailgate 10 at the cross member 17 by a bonding tape 78. The screen 12 has a screen printed area 70 at the bonding tape 78. The cross member 17 is part of the tailgate box structure and forms a structural element.

The cross member 17 delimits, with the rear screen 12, a housing 74 comprising an interior opening which is closed by means of a lining 72 which is attached so as to form a longitudinal wall of the housing, adjacent and arranged towards the inside of the rear screen 12. In this case, the cross member 17 locally has a "semi-∪-shaped" cross-section in which the bottom of the ∪ is not complete and the side inner leg of the ∪ does not exist.

Furthermore, the lining 72 comprises a longitudinal edge connecting with the rear screen 12, provided with a leaf type flexible seal 76. The screen 12 comprises a second screen printed area 90 at the seal 76.

In this example, the lining 72 forms a support for an electrical element 80, for example an external camera or a light. To this end, the lining 72 comprises a substantially horizontal plate 76 which supports the electrical element 80.

The lining 72 is removably mounted on the cross member 17 by means of a screw.

In the examples described, the box structure of the tailgate 10 is made of composite material, such as fiber reinforced plastic.

The invention is not limited to the examples described and other embodiments will be clearly apparent to those skilled in the art.

In particular, the structural element may take a different overall shape. Preferably, it has a "semi-∪-shaped" cross-section, i.e. at least one side leg of the ∪ is absent.

The invention claimed is:

1. A motor vehicle tailgate comprising a plastic box structure comprising at least one structural element supporting a rear screen, the structural element being elongated in a longitudinal direction, wherein the structural element delimits, with the rear screen, a housing comprising an interior opening, the interior opening being closed by means of a lining which is attached so as to form at least partially a longitudinal wall of the housing, adjacent to the rear screen and arranged towards the inside of the rear screen, in such a way that the housing houses an electrical element of the vehicle.

2. The tailgate according to claim 1, wherein the structural element belongs to the group comprising a lateral upright and a horizontal cross member.

3. The tailgate according to claim 1, wherein the lining forms a support for the electrical element.

4. The tailgate according to claim 1, wherein the electrical element is an optical element.

5. The tailgate according to claim 1, wherein the lining comprises an attachment part for a light source and an attachment part for a reflector, these attachment parts comprising holes made in offset support surfaces at different distances from the rear screen.

6. The tailgate according to claim 1, wherein the electrical element comprises an element from the group consisting of a camera, a sensor, a receiver, a transmitter, an antenna.

7. The tailgate according to claim 1, wherein the structural element, assembled with the screen and the lining has a cross-section whose outer contour has a substantially quadrilateral shape, one side of the quadrilateral being formed by the rear screen, two other consecutive sides being formed by the structural element and the last side, connecting the rear screen and the structural element, being formed at least partially by the lining.

8. The tailgate according to claim 1, wherein the lining is removably mounted on the structural element.

9. The tailgate according to claim 1, wherein the lining comprises a longitudinal edge connecting with the rear screen, provided with a flexible seal.

10. The tailgate according to claim 1, wherein the lining is made of thermoplastic material and/or the structural element is made of thermoplastic material, thermosetting material or composite material.

* * * * *

UNITED STATES PATENT AND TRADEMARK OFFICE
CERTIFICATE OF CORRECTION

PATENT NO. : 10,399,415 B2  
APPLICATION NO. : 15/740695  
DATED : September 3, 2019  
INVENTOR(S) : Franck Leterrier et al.

Page 1 of 1

It is certified that error appears in the above-identified patent and that said Letters Patent is hereby corrected as shown below:

On the Title Page

Item (71):  
"Issam Khayat, Lyons (FR)" should be changed to -- Issam Khayat, Lyon (FR) --

Item (72):  
"Issam Khayat, Lyons (FR)" should be changed to -- Issam Khayat, Lyon (FR) --

Signed and Sealed this  
Twenty-ninth Day of October, 2019

Andrei Iancu  
*Director of the United States Patent and Trademark Office*